United States Patent

[11] 3,544,703

| | | | |
|---|---|---|---|
| [72] | Inventor | Terry D. Jones<br>4116 Sunswept Drive, Studio City,<br>California 91604 | |
| [21] | Appl. No. | 797,311 | |
| [22] | Filed | Dec. 26, 1968<br>Continuation-in-part of Ser. No. 668,323,<br>Sept. 18, 1967, now pending which is<br>a continuation-in-part of Ser. No. 431,034,<br>Feb. 8, 1965, abandoned. | |
| [45] | Patented | Dec. 1, 1970 | |

[54] WALL PLATE STRUCTURE
10 Claims, 9 Drawing Figs.

[52] U.S. Cl. ................................................. 174/66,
220/24.2
[51] Int. Cl. ....................................................... H02g 3/14
[50] Field of Search............................................. 174/48, 53,
66, 67, 57; 220/24.2, 24.3, 3.7, 3.8

[56] References Cited
UNITED STATES PATENTS

| | | | |
|---|---|---|---|
| 1,567,863 | 12/1925 | Sargent et al. | 174/57 |
| 1,939,645 | 12/1933 | Adam | 220/3.4X |
| 2,886,630 | 5/1959 | Gill | 174/57 |
| 3,027,416 | 3/1962 | Kissel | 174/57 |
| 3,197,549 | 7/1965 | Good | 174/66 |

*Primary Examiner*—Lewis H. Myers
*Assistant Examiner*—D. A. Tone
*Attorney*—Finkelstein and Mueth ABSTRACT: This patent describes a wall plate structure comprised of a frame with an outwardly extending peripheral flange with grooved means in front interior edge of said peripheral flange, a laterally extending flange at the back, as a part of the frame, extending to an opening, a flat plate with suitable apertures and mounting screw holes, said plate to seat in said grooved means of said outwardly extending flange, said plate being substantially flush with the front edge of said outwardly extending flange, a space provided between said plate and said laterally extending flange for mounting of devices, means attaching said plate to said devices, means for mounting said devices through said opening to box or plaster ring.

PATENTED DEC 1 1970  3,544,703
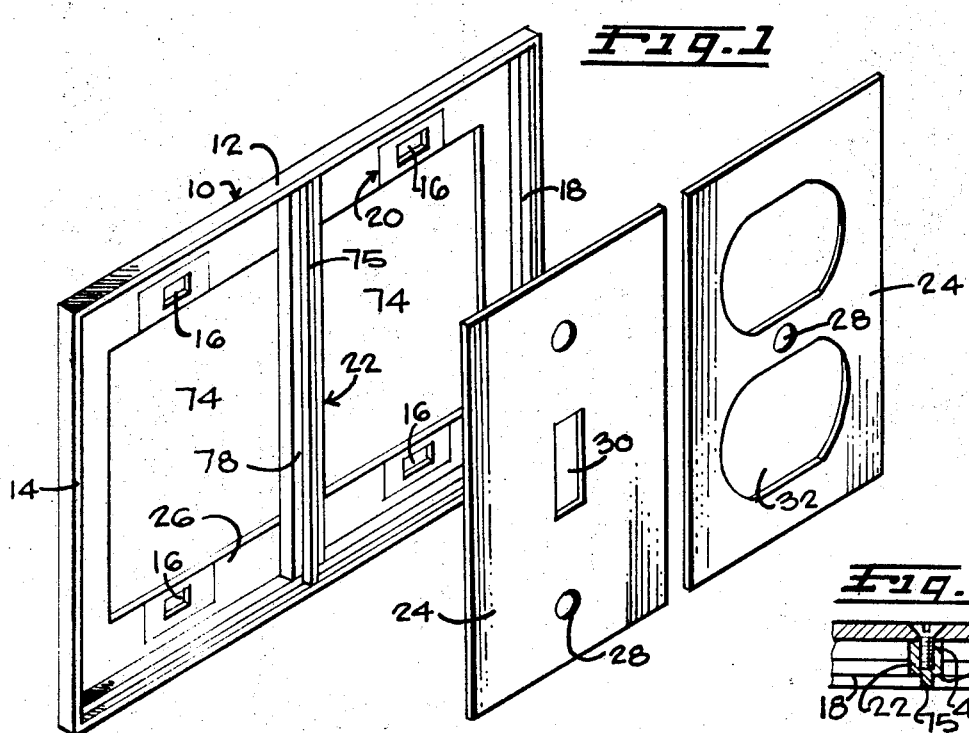
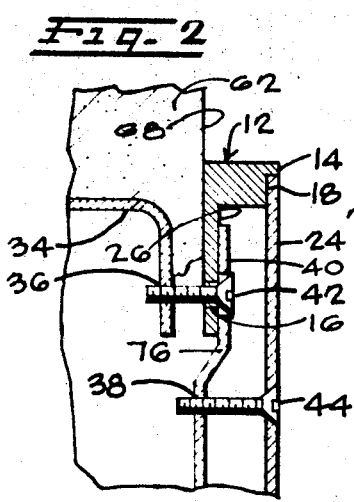
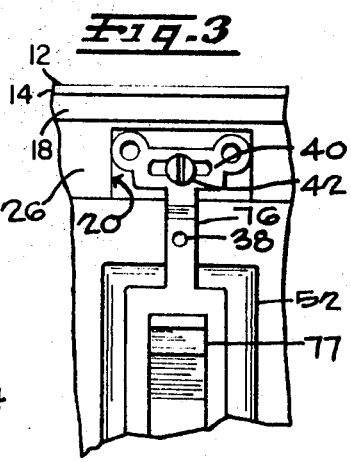
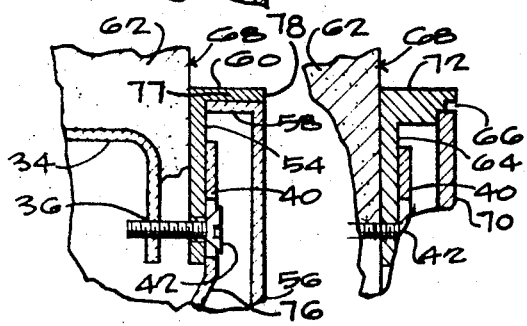
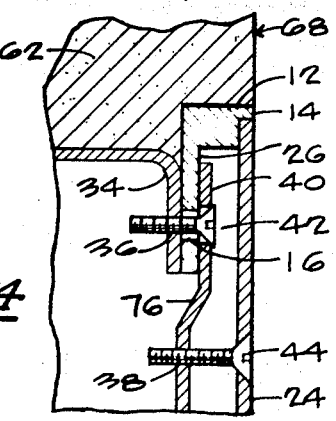
INVENTOR
Terry D. Jones

WALL PLATE STRUCTURE

This application is a continuation-in-part of my copending U.S. application Ser. No. 668,323, filed September 18, 1967, which in turn was a continuation-in-part of Ser. No. 431,034, filed February 8, 1965, now abandoned.

BACKGROUND OF THE INVENTION

This invention relates to a novel device plate or wall plate, e.g., an electrical wall plate structure, and is concerned with a wall plate that is designed to be on surface of the wall or flush with it.

Conventional wall plates for medical gas valves, electrical outlets, switches, intercommunication devices and related apparatus are of one piece, coined or curved metal, plastic or other material.

Such wall plates rely on the surface of an outlet box or plaster ring to provide a seating ledge for the mounting of aforementioned devices.

In many cases, the outlet box or plaster ring is depressed in the wall or paneling. This condition causes the device to fall back into the cavity created. If washers or other means are not placed behind the device mounting ears to bring the device substantially to the intended plane of the wall, the device, such as a toggle switch, may be hard to operate in that it may be difficult or impossible to grasp. In the case of electrical receptacles, installed in the depressed condition described above, it is possible that the device may be far enough back into the wall to allow a gap between the plate and the device, creating a path to the exposed electrical connections on the device.

Further, conventional wall plates accommodating two or more devices have no means of alining the devices behind before mounting the plate. Usually the installer leaves the device mounting screws slightly loose. The conventional wall plate is placed over the devices and a pointed instrument is used to probe through the apertures to bring the device plate mounting screw holes in alinement so that the plate mounting screws may be properly installed.

Conventional wall plates, when mounted on a surface that is covered with wallpaper, fabric or veneers, are sometimes covered with a like piece of material. The compound surface of conventional wall plates make such covering difficult.

SUMMARY OF THE INVENTION

Briefly, the present invention comprises a wall plate structure comprised of a frame with an outwardly extending peripheral flange with grooved means in front interior edge of said peripheral flange, a laterally extending flange at the back, as a part of the frame, extending to an opening, a flat plate with suitable apertures and mounting screw holes, said plate to seat in said grooved means of said outwardly extending flange, said plate being substantially flush with the front edge of said outwardly extending flange, a space provided between said plate and said laterally extending flange for mounting of devices, means attaching said plate to said devices, means for mounting said devices through said opening to box or plaster ring.

More particularly, the invention structure comprises a frame having an outwardly extending peripheral wall and an opening on the back side to approximate the opening of an electrical box or plaster ring. In one embodiment, elongated holes are provided in the top and bottom ledge of the frame thus created for mounting the frame and devices to the threaded holes in the plaster ring and/or outlet box by means of machine screws. A plate is designed to seat within the above-noted frame so that preferably, the outer surface is about flush with the outer edge of the peripheral wall of the frame. The frame is mounted within or on, plaster, dry wall, or wood paneling and held in position by means of the machine screws used to hold the device or devices. The frame can be installed substantially flush with the adjacent surface of the wall or on the surface of the wall and projecting outwardly therefrom.

The back ledge, of the frame, which can be used to support the mounting ears of devices at the elongated mounting holes is provided with marks or a depression which outlines the device ears thus enabling the user to locate each device exactly in place requiring no further adjustment. It is also to be understood that the elongated mounting holes and associated end flange portions can be eliminated. In this event, the frame can be mounted on the wall, for example, by embedding the frame in plaster before the plaster sets so that the frame is flush with the wall. Many other mounting techniques will be apparent to those skilled in the art.

The frame is provided with removable or permanent sections of intermediate frame which are substantially flush with the outer peripheral edge of the main frame. These sections of intermediate frame are installed across a multiple gang frame, approximately between device positions, held in place by screws, pins or the like or permanently molded or formed as a part of the frame, to provide individual or multigang plate positions.

The device plate hereof can be a flat plate with suitable apertures therein and of a size such as to fit snugly within the frame and adapted to seat on peripheral ledge around the inside of the frame and barrier frame if used. Alternately, such wall plate can be provided with a peripheral flange and of a size such that said flange rests within the peripheral wall of the frame.

It is the object of the instant invention to design a wall plate, for example, in the form of a switchplate, medical gas valve plate, intercommunication device plate, receptacle outlet plate, or the like, which is mounted so that the outer surface thereof is substantially flush with the adjacent wall surface, or mounted on the surface of the wall.

It is also the object of this invention to design said wall plate with markings or depressions on the inner surface of the frame so as to allow devices to be alined and tightened in place before cover plate is installed.

Another object of this invention is to design said wall plate with removable or permanent intermediate frames between device mounting positions as a part of or mounted to the main frame. Such sections of intermediate frame when installed across main frame and substantially flush with peripheral edge of frame, create individual plate positions, which may be of any size. Said sections of intermediate frame thus installed in main frame enable prestamped plates to be placed into the framed openings, of like size, thus created. Conventional wall plates, being of one piece, would be difficult to install in this side by side manner, and having no flange to hold them in place would be impossible to hole in alinement.

Another object of this invention is to design said wall plate which allows the use of various finishes and colors which may differ between frame and plate. Different finishes of various materials when used in combination on said wall plate create a decorative and esthetically pleasing combination. Conventional wall plates, being of one piece, are limited to the use of one material and color.

The above and other objects of the invention will be apparent from the following description of the invention.

DESCRIPTION OF PREFERRED EMBODIMENTS

In practice, using one embodiment of the invention to install a switch, receptacle or other device flush with the surface of the adjacent wall, the frame of the invention is suitably connected to the outwardly extending plaster ring of an outlet box or other box which is mounted on a wall supporting member, such as a wall stud and positioned behind the surface of the wall to be formed, a distance equal to the depth of the frame. Plaster or equivalent forming material is then applied in the usual manner around this assembly to form the wall. The frame is embedded in the wall with the outer edge of the peripheral wall of the frame being about flush with the outer surface of the wall. The device is then mounted within the box and connected across the frame in the positions indicated by marks, depressions or other on the frame and connected and held to the box or plaster ring with the device mounting screws in the usual manner. The device cover plate is seated within the frame and connected to the device by the plate mounting screws. The plate is now substantially flush with the outer surface of the wall. If a multiple gang frame and plate is installed, the above steps are followed and the intermediate frames are installed between gangs and the plates are installed as described above.

To install a switch or other device on the surface of the wall, using a preferred embodiment of the invention, the device is mounted within the box and connected across the frame in the positions indicated by marks, depressions or other on the frame and connected and held to the box or plaster ring which has been installed substantially flush with the outer surface of the wall, with device mounting screws in the usual manner. The device cover plate is seated within the frame and connected to the device by the plate mounting screws. The frame is now seated substantially even with the surface of the adjacent wall and projecting outwardly therefrom. If a multiple gang frame and plate is installed, the same steps are followed as described under the installation of the flush frame and plate.

The invention will be more clearly understood by reference to the description below of certain preferred embodiments taken in connection with the accompanying drawing wherein:

FIG. 1 shows an exploded view in perspective of the components of one embodiment of the invention device;

FIG. 2 shows an enlarged partial section taken vertically through the approximate center of a gang with a device installed and the invention mounted on the surface of the wall;

FIG. 3 is an enlarged partial view of a device installed on the frame of the invention with cover plate removed showing the device alinement indication;

FIG. 4 shows a section similar to FIG. 2 except that the invention has been embedded substantially flush with the outer surface of the wall;

FIG. 5 is another section similar to FIG. 2 indicating another embodiment of the invention;

FIG. 6 is another section similar to FIG. 2 indicating another embodiment of the invention;

FIG. 7 is a horizontal section through the intermediate frame indicating a method of attachment to the main frame;

FIG. 8 is another method of attachment of intermediate frame to main frame shown in section; and FIG. 9 is a horizontal section through the intermediate frame indicating another method of attachment to the main frame.

Viewing particularly FIG. 1 of the drawing, the invention device comprises a frame 10 designed to be either embedded in a plaster or other wall or surface mounted thereon, and a mating plate 24 designed to be seated within frame 10 as described in detail below. Frame 10 is generally a rectangular shape and has an integral peripheral wall extending outwardly, preferably at right angles to the main frame portion 26, such peripheral wall extending entirely around the frame. The inner edge of the outer peripheral flange 12 being provided with a grooved means 18. At the opposite ends of the inner portion 26 of the frame are a pair of slots 16. The frame 10 can be provided with sharp corners as shown in FIG. 1 or can be rounded. Such frame can be formed of such as die cast aluminum, plastic or other material. The inner portions of the frame 26 is provided with marks 20, depressions or other of the outline size of device mounting ears 40 and as best seen in FIG. 3. Approximately midpoint between gang positions is an intermediate frame 22 which may be permanent or removable. The grooved means 78 on the outer edge of intermediate frame 22 are designed to place the grooved means 78 of the intermediate frame 22 substantially even with the grooved means 18 of the frame 10. The intermediate frame 22 is held to the main frame 10 by means shown in FIG. 7, a machine screw 46 through frame 26 to intermediate frame 22; FIG. 8, an outwardly extending stud 48 from frame 26 into hole in intermediate frame 22; and FIG. 9, an inwardly extending appendage 50 from intermediate frame 22 into a hole in main frame flange 26.

The device plates 24 are generally rectangular in shape as shown and of dimensions such as to fit snugly within frame 10 and intermediate frame 22 if used. In the case of one gang frame requirements (not shown), the frame will be all one piece 10 and intermediate frame 22 will not be required. The plate 24 is provided with apertures 30, 32 as required to receive the device 52. Plates are held in place by screws 44 through holes 28 to matching holes 38 in device 52, and once in place, the surface of plate 24 is substantially flush with the outer peripheral edge 14 of frame 10. The plate can be formed of aluminum, steel, or plastic and can be colored if desired.

To mount the invention device described above in a wall so that the outer surface of the switchplate 24 is flush with the surface of the wall 68, an outlet box (not shown) is mounted to the supporting members (not shown) of the wall 68 and the plaster ring 34 is affixed thereto by means of screws (not shown). Frame 10 is mounted on plaster ring 34 with the peripheral wall of frame 10 extending outwardly as best seen in FIG. 4. Frame 10 is connected to ring 34 after electrical box (not shown) is properly positioned, by screws 42 received through slots 16 of frame 10 and in the mating holes 36 in the plaster ring 34. Plaster or other forming material 62 is then applied to form the wall 68. The plaster surrounding portions of the outlet box (not shown), plaster ring 34 and the peripheral wall of frame 10, the so-formed wall being flush with the outer edge 14 of frame 10 and plate 24. The frame 10 is now embedded in wall 68 in a fixed position.

The screws 42 are then removed and the device 52 is now inserted through the central opening 74 of frame 10 and positioned exactly within the opening of the plaster ring 34 by means of marks 20 or depression on frame ledge 26. The mounting ears 40 of the device 52 are connected to the frame 10 through slots in ears 40 at the opposite ends of device 52 and through slots 16 of the frame 10 into the threaded holes 36 of the plaster ring 34. The wall plate 24 (or plates in the case of multiple gangs) is now seated within the frame 10 as seen in FIG. 4, with the edge of plate 24 seating snugly within the groove means 18 and 78 of the frame 10 and intermediate frame 22 and substantially flush with the outer edge 14 of the frame 10 and the outer edge 75 of the intermediate frame 22. The plate 24 (or plates) is held in place by screws 44 through holes 28 and plate 24 to threaded holes 38 in device mounting yoke 76. It will be seen that in the assembled position, the outer surface of plate 24 is substantially flush with the adjacent wall surface 68, with the device 52 held in exact position so that the only protrusions from the surface of the wall being the switch handle 77.

To mount the said invention on the surface of the wall so that the frame 10 projects outwardly from the wall surface 68, refer to FIG. 2. An outlet box (not shown) and plaster ring 34 is installed in a wall 68 with the plaster 62 or other material substantially flush with or covering plaster ring 34. The device 52 is inserted through the central opening 74 of frame 10 in position and exactly centered by means of marks 20 or depression on ledge 26 of frame 10. The mounting ears 40 of the device 52 are connected to the frame as described under the mounting for a flush mounted device above. It will be seen that in the assembled position, see FIG. 3, the frame 10 is mounted on the surface of wall 68 and the frame 10 is projecting outwardly therefrom and the device 52 is held securely within the cavity created between plate 24 and frame 10 ledge 26.

FIG. 5 is a modified form of frame 60 and plate 56 construction. The modified embodiment provides an outwardly extending flange 77 around the entire peripheral edge of frame 60. Plate 56 is also provided with an inwardly extending flange 58 which may or may not extend around the entire peripheral edge of plate 56. Plate flange 58 and matching frame flange 77 are of such size to place front edge 78 of frame 60 substantially flush with the outer surface of plate 56. Intermediate frame (not shown) will have straight sides and be fixed to frame ledge 54 in a manner similar to methods shown in FIGS. 7, 8 and 9 or be permanently molded to the main frame. It will be understood that frame ledge 54 may also be provided with device locator marks 20 or depressions as shown in FIG. 3. Methods of installation for flush and surface applications are the same as described herein.

FIG. 3 is a partial enlarged elevation of device 52 mounted on frame ledge 26 with cover plate 24 removed. Outer limits of device mounting ears 40 of device 52 are positioned within confines of marks 20 (or depression) on the ledge 26 of frame 10. The device 52 is held to frame 10 by means of screws 42 through holes in device ears 40 and slots 16 in frame 10 to threaded holes 36 in the plaster ring 34 as described before.

FIG. 7 is a section through the intermediate frame 22 and it rests on ledge 26 of frame 10. Rear of intermediate frame 22 is tapped at each end, approximately at center of ledge 26, to receive screw 46 through counter sunk hole in ledge 26 of frame 10. Intermediate frame 22 grooved means 78 and grooved means 18 of frame 10 are substantially on the same plane providing a continuous seat for plate 24. Peripheral edge 14 of frame 10 and outer edge 75 of intermediate frame 22 are on the same plane.

FIG. 8 is another embodiment of intermediate frame 22 and differs from FIG. 7 only in the method of securing frame 22 and main frame 10 together. Frame 10 ledge 26 is provided with an outwardly extending stud (preferably round) and a suitable mating aperture in intermediate frame 22. Pressure or adhesive means secures the mating parts together. As described under FIG. 7, grooved means 78 of intermediate frame 22 and grooved means 18 of frame 10 are substantially on the same plane providing a continuous seat for plate 24. Peripheral edge 14 of frame 10 and outer edge 75 of intermediate frame 22 are on the same plane.

FIG. 6 shows another modified form of frame 72 construction. This construction differs from frame in FIG. 1 and FIG. 2 by the reveal 66 in the inner peripheral wall of frame 72. Methods of installation, barriers 22, device positioning marks 20 or depressions are the same as described before.

FIG. 9 is still another section through the intermediate frame 22 as it rests on ledge 26 of frame 10. Intermediate frame 22 is provided with outwardly extending studs 50 (preferably round) at either end of intermediate frame 22 approximately at the center of ledge 26 of frame 10. Frame 10 ledge 26 is provided with suitable aperture, and mating stud 50 is held together by pressure or adhesive means. Grooved means 78 of intermediate frame 22 and grooved means 18 of frame 10 are substantially on the same plane, providing a continuous seat for plate 24. Peripheral edge 14 of frame 10 and outer edge 75 of intermediate frame 22 are on the same plane.

It will be understood that even though ledges 78 are shown on intermediate frame 22, the ledges 78 may be omitted and straight sides be substituted thus providing no support for the plate 24 but providing a separation between plates 24.

It will be understood that in place of rectangular wall plates, wall plates of any other desired shape, such as square or circular, can be employed to mate with a frame having a similarly shaped, e.g., square or circular, peripheral wall according to the invention.

It will also be understood that the principles of the invention are applicable to gas valves, telephone outlets, electrical outlets, thermostat outlets, intercommunication outlets and in general for mounting instruments on or in walls. Hence the term "wall plate" as employed in the claims is intended to denote and include equivalent elements such as those noted above.

While I have described particular embodiments of my invention for the purpose of illustration, it should be understood that various modifications and adaptations thereof may be made within the spirit of the invention as set forth in the appended claims.

I claim:

1. A wall plate structure comprised of a frame having an outwardly extending peripheral flange with grooved means in front interior edge of said peripheral flange, a laterally extending flange which is flat on both of its sides at the back of said peripheral flange extending to an opening, said peripheral flange and said laterally extending flange being of a single piece, a flat plate with suitable apertures and mounting screw holes, said plate to seat in said grooved means of said outwardly extending flange, said plate being substantially flush with the front edge of said outwardly extending flange, and a space provided between said plate and said laterally extending flange adapted for the mounting of devices.

2. The structure of claim 1 wherein slotted mounting holes are provided in the top and bottom of said laterally extending flange.

3. A wall plate structure of claim 1, having device ear locating means on said laterally extending flange at device mounting positions.

4. A wall plate structure as defined in claim 1, with an intermediate frame between gang positions.

5. A wall plate structure comprised of a rectangular metal frame having an outwardly extending peripheral flange with grooved means in front interior edge of said peripheral flange, a laterally extending flange which is flat on both of its sides at the back of said peripheral flange extending to an opening, said peripheral flange and said laterally extending flange being of a single piece, a flat plate with suitable apertures and mounting screw holes, said plate to seat in said grooved means of said outwardly extending flange, said plate being substantially flush with the front edge of said outwardly extending flange, and a space provided between said plate and said laterally extending flange adapted for the mounting of devices.

6. The combination comprising a wall surface and a frame having an outwardly extending peripheral flange with grooved means in front interior edge of said peripheral flange, a laterally extending flange which is flat on both of its sides at the back of said peripheral flange extending to an opening, said peripheral flange and said laterally extending flange being of a single piece, a flat plate with suitable apertures and mounting screw holes, said plate to seat in said grooved means of said outwardly extending flange, said plate being substantially flush with the front edge of said outwardly extending flange, and a space provided between said plate and said laterally extending flange adapted for the mounting of devices, the entire wall plate structure being mounted on the surface of the wall and projecting outwardly therefrom.

7. The combination comprising a wall surface and a frame having an outwardly extending peripheral flange with grooved means in front interior edge of said peripheral flange, a laterally extending flange which is flat on both of its sides at the back of said peripheral flange extending to an opening, said peripheral flange and said laterally extending flange being of a single piece, a flat plate with suitable apertures and mounting screw holes, said plate to seat in said grooved means of said outwardly extending flange, said plate being substantially flush with the front edge of said outwardly extending flange, and a space provided between said plate and said laterally extending flange adapted for the mounting of devices, the entire wall plate structure being mounted on the surface of the wall and being flush therewith.

8. A wall plate structure comprised of a frame having an outwardly extending peripheral flange, a laterally extending flange which is flat on both of its sides at the back of said peripheral flange extending to an opening, said peripheral flange and said laterally extending flange being of a single piece, a flat plate with suitable apertures and mounting screw holes, said flat plate to have an inwardly extending peripheral flange on two or more sides with said inwardly extending flange of said plate providing between said lateral peripheral flange and plate a space for mounting devices, the outer surface of said plate and outer edge of said outwardly extending flange being substantially flush.

9. A wall plate structure comprised of a frame having an outwardly extending peripheral flange, a laterally extending flange which is flat on both of its sides at the back of said peripheral flange extending to an opening, said peripheral flange and said laterally extending flange being of a single piece, a flat plate with suitable apertures and mounting screw holes, said flat plate to have an inwardly extending peripheral flange on two or more sides with said inwardly extending flange of said plate providing between said lateral peripheral flange and plate a space for mounting devices, the outer surface of said plate and outer edge of said outwardly extending flange being substantially flush, the entire wall plate structure being mounted on the surface of the wall and projecting outwardly therefrom.

10. A wall plate structure comprised of a frame having an outwardly extending peripheral flange, a laterally extending flange which is flat on both of its sides at the back of said peripheral flange extending to an opening, said peripheral flange and said laterally extending flange being of a single piece, a flat plate with suitable apertures and mounting screw holes, said flat plate to have an inwardly extending peripheral flange on two or more sides with said inwardly extending flange of said plate providing between said lateral peripheral flange and plate a space for mounting devices, the outer surface of said plate and outer edge of said outwardly extending flange being substantially flush, the entire wall plate structure being mounted on the surface of the wall and being flush therewith.